United States Patent [19]

Saito

[11] Patent Number: 4,920,289
[45] Date of Patent: Apr. 24, 1990

[54] BEARING HOLDER WITH RESILIENT RETAINING PAWLS

[75] Inventor: Yasujiro Saito, Yokohama, Japan

[73] Assignee: Jidosha Denki Kogyo Kabushiki Kaisha, Kanagawa, Japan

[21] Appl. No.: 292,970

[22] Filed: Jan. 3, 1989

[30] Foreign Application Priority Data

Jan. 12, 1988 [JP] Japan .............................. 63-1683[U]

[51] Int. Cl.⁵ .............................................. H02K 5/16
[52] U.S. Cl. ..................................... 310/90; 267/161; 310/42; 384/210
[58] Field of Search ............................ 310/83, 90, 42; 267/161, 162, 164, 181; 384/209, 210, 214, 215, 203

[56] References Cited

U.S. PATENT DOCUMENTS

| | | | |
|---|---|---|---|
| 3,483,888 | 12/1969 | Wurzel | 267/161 |
| 4,487,551 | 12/1984 | Mizutani | 267/161 |
| 4,496,137 | 1/1985 | Reik | 267/161 |
| 4,713,568 | 12/1987 | Adam et al. | 310/83 |
| 4,747,586 | 5/1988 | Reik | 267/161 |

*Primary Examiner*—Patrick R. Salce
*Assistant Examiner*—D. L. Rebsch
*Attorney, Agent, or Firm*—Sughrue, Mion, Zinn, Macpeak & Seas

[57] ABSTRACT

A bearing holder comprises a plurality of pawls engaged with an internal surface of the bearing containing part, a plurality of slots arranged in circumferences of the pawls, and bearing-contacting part in contact with an outer periphery of the bearing. It is used for holding the bearing supporting an armature shaft of a motor equipped with reduction gear, for example.

3 Claims, 2 Drawing Sheets

BEARING HOLDER WITH RESILIENT RETAINING PAWLS

BACKGROUND OF THE INVENTION

1. Field of the Invention

This invention relates to a bearing holder used for holding a bearing into a through hole of a gear case or a bearing fixed part of a yoke of a motor equipped with a reduction gear, for example.

2. Description of the Prior Art

There have been various structures of such bearing holders in the past. Among them, there has been a bearing holder having a structure as shown in FIG. 5 and FIG. 6.

The bearing holder 101 is formed with an elastic material, and has a structure comprising a fitting face 106 secured to an inner peripheral face 105 of a bearing fixed part 104 provide at an end of a through hole 103 of a gear case 102 and plural bearing stoppers 108 contacting a spherical oilless bearing 107 along its outer periphery, as shown in FIG. 5 and FIG. 6.

After the bearing holder 101 is inserted into the bearing fixed part 104, the outer periphery of bearing fixed part 104 is punched at several points. Deformation caused by the punching of the fitting face 106 of the bearing holder 101 acts as a stopper for the bearing holder 101 by itself, and the oilless bearing 107 is held in the gear case 102 even if an armature shaft 109 supported by the oilless bearing 107 is off-centered owing to the elasticity of the bearing holder 101.

However, in the aforementioned conventional bearing holder 101, there is a problem in that there are too many steps required for punching the periphery of the bearing fixed part 104 of the gear case 12 in order to make a stop of the bearing holder 101.

Additionally, there is another problem in that the oiless bearing 107 sometimes can not be supported securely when the armature shaft 109 is off-centered because deformation of the fitting face 106 of the bearing holder 101 is sometimes not enough to act as a stopper by itself.

There is a further problem in that the bearing stopper 108 is deformed causing the oilless bearing 107 to be dislodged if the motor receives an impact.

SUMMARY OF THE INVENTION

An object of this invention is to provide a bearing holder which supports a bearing securely by simple work.

The bearing holder according to this invention is characterized by having a plurality of pawls engaged with an internal surface of a bearing fixed part containing a bearing, a plurality of slots arranged along the circumferences of the pawls, and an annular bearing-contacting part in contact with the bearing, in order to solve the problems of the conventional bearing holder described above.

DESCRIPTION OF THE PREFERRED EMBODIMENT

This invention will be explained below in reference to the drawings.

Figure 1:
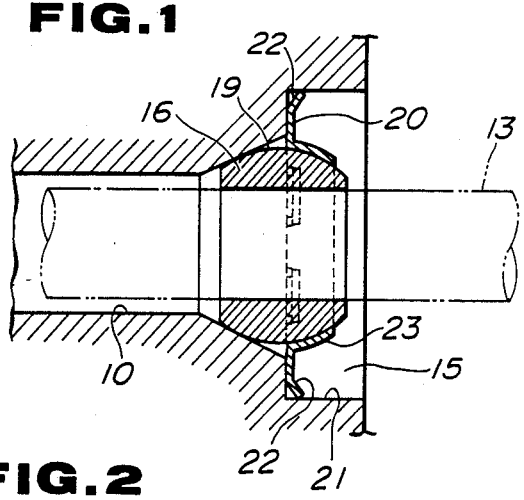
FIG. 1 is a cross-sectional view showing structure of an embodiment of the bearing holder according to the invention.
Figure 2:
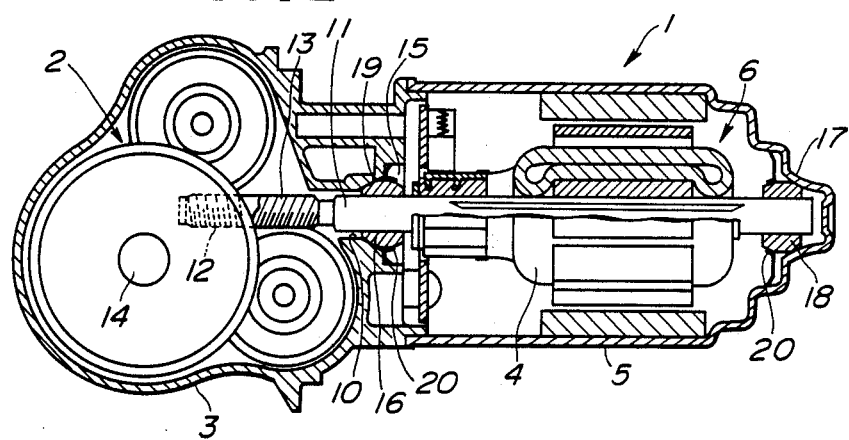
FIG. 2 is a cross-sectional view showing structure of a wiper electric motor.
Figure 4:
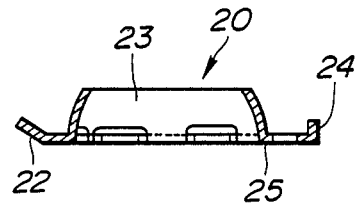
FIG. 4 is a cross-sectional view on line A—A of FIG. 3.
Figure 5:
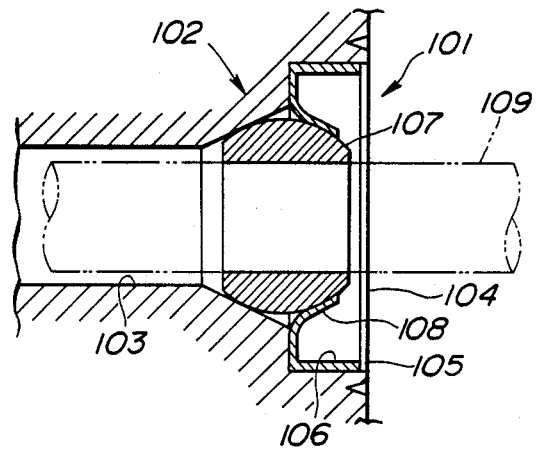
FIG. 5 and FIG. 6 are a cross-sectional view and a front view showing structure of the conventional bearing holder, respectively.
Figure 6:
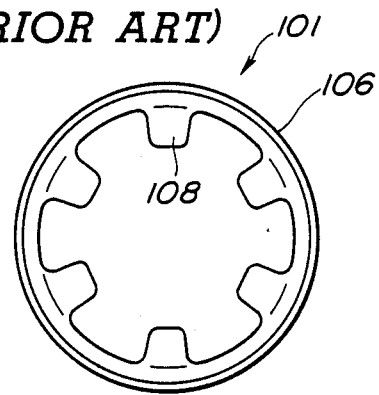

FIG. 1 and FIG. 4 are drawings showing an embodiment of the bearing holder according to this invention, and FIG. 2 is a cross-sectional view of a wiper electric motor explained as an example in this embodiment.

In FIG. 2, numeral 1 is the wiper electric motor. The wiper electric motor 1 is constructed by connecting a gear case 3, housing a reduction gear 2, with a motor part 6 supporting an armature 4 in a yoke 5.

The armature 4, of which an armature shaft 11 protrudes into the gear case 3 through a hole 10 provided in the gear case 3, drives an output shaft 14 by engaging a pair of worms 12 and 13 formed at the top of the armature shaft 11 with the reduction gear 2.

The armature shaft 11 is supported rotatably by an oilless bearing 16 in a bearing fixed part 15 provided in the through hole 10 of the gear case 3 and an oilless bearing 18 in a bearing fixed part 17 provided in the yoke 5.

The oilless bearing 16, which is spherical as shown also in FIG. 1, is held by a bearing holder 20 in a state in which its outer periphery is in contact with a slope 19 of the bearing fixed part 15.

Figure 3:
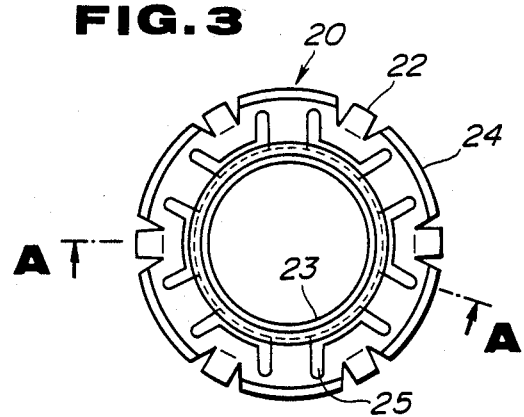
FIG. 3 is a front view of the bearing holder.

The bearing holder 20, which is formed with an elastic material, is provided with a plurality of pawls 22 engaged with an inner peripheral face 21 in a state in which the bearing holder 20 is press-fitted into the inner peripheral face 21 of the bearing fixed part 15, and an annular bearing-contacting part 23 contacting the oilless bearing 16 along its outer periphery as shown also in FIG. 3 and FIG. 4.

The bearing holder 20 is provided with plural guide planes 24 for making the pawls 22 engage said inner peripheral face 21 accurately in the press-fitted state. The guide planes 24 are provided between the pawls 22, respectively.

The bearing holder 20 is provided with U-shaped slots 25 disposed in the circumstance of the pawls 22. The slots 25 have the effect of maintaining the spring characteristics, which influences a pressing force of the bearing holder 20 against the oilless bearing 16, constant.

The pawls 22 are formed by bending so as to slant in the direction of the bearing-contacting part 23.

Consequently, when the bearing holder 20 is press-fitted into the bearing fixed part 15, respective pawls 22 are engaged with the inner peripheral face 21 in a state in which the bearing holder 20 is kept in the proper position under the action of respective guide planes 24. Thereupon, the annular bearing-contacting part 23 of the bearing holder 20 is in contact with the oilless bearing 16 at the outer periphery. Thereby, the oilless bearing 16 can be held securely in the bearing fixed part 15 even if the bearing holder 20 receives a backward force caused by its elasticity or an eccentricity of the armature shaft 11 because the pawls 22 are engaged with the inner peripheral face 21.

Furthermore, the oilless bearing 16 can be prevented from being dislodged by the bearing-contacting part 23 even when the wiper electric motor 1 receives a heavy impact caused by falling or the like.

Additionally the oilless bearing 18 of the bearing fixed part 17 in the yoke 5 can be held by the bearing holder 20 in the same manner as described above.

In the above-described embodiment, the wiper electric motor has been explained as an example of the motor equipped with reduction gear, in addition to above, the bearing holder according to this invention can be applied to a motor for a power window, a motor for a roof hatch and the like.

As described above, the bearing holder according to this invention has configuration comprising a plurality of pawls engaged with an internal surface of a bearing fixed part containing a bearing, a plurality of slots arranged along the circumstance of the pawls, and an annular bearing-contacting part in contact with the bearing. Therefore, according to this invention, assembly of the motor becomes simple and speedy as compared with the conventional motor because the bearing can be held by merely press-fitting the bearing into the bearing fixed part. Further, the bearing can be held securely so that it is prevented from being dislodged even if impact is applied because the pawls are engaged with internal surface and the annular bearing-contacting part is in contact with the bearing at the time of press-fitting the bearing holder. Furthermore, fluctuations of the pressing force acting on the bearing disappear since the slots can make the spring characteristics constant.

What is claimed is:

1. A bearing holder for securing a bearing in a bearing fixed part provided in a through hole of a gear case, comprising:
    an annular member including a plurality of pawls disposed in an outer circumference of said annular member and extending radially outwardly therefrom;
    a bearing contact portion disposed along an inner circumference of said annular member for contacting said bearing; and
    a plurality of guide planes disposed on the outer circumference of said annular member and extending axially with respect to said annular member for securing said annular member to said fixed part and a plurality of slots disposed proximate said pawls for maintaining a spring force of said bearing holder against said first part.

2. A bearing holder according to claim 1, wherein said bearing fixed part is disposed in a through hole connecting a gear case with a motor part of a motor equipped with a reduction gear which is constructed by connecting the motor part with the gear case housing the reduction gear.

3. A bearing holder according to claim 2 or 1, wherein said bearing fixed part is provided on a yoke of a motor part of a motor equipped with a reduction gear which is constructed by connecting the motor part with a gear case housing the reduction gear.

* * * * *